(12) United States Patent
Herbert

(10) Patent No.: US 11,399,061 B2
(45) Date of Patent: Jul. 26, 2022

(54) STATE CONTAINER SYNCHRONIZATION SYSTEM AND METHOD

(71) Applicant: eCIFM Solutions Inc., San Ramon, CA (US)

(72) Inventor: Michael P. Herbert, Bensalem, PA (US)

(73) Assignee: eCIFM Solutions Inc., San Ramon, CA (US)

( * ) Notice: Subject to any disclaimer, the term of this patent is extended or adjusted under 35 U.S.C. 154(b) by 0 days.

(21) Appl. No.: 17/175,754

(22) Filed: Feb. 15, 2021

(65) Prior Publication Data
US 2021/0168205 A1 Jun. 3, 2021

Related U.S. Application Data

(63) Continuation of application No. 16/240,558, filed on Jan. 4, 2019, now Pat. No. 10,924,546.

(51) Int. Cl.
| | |
|---|---|
| *G06F 15/16* | (2006.01) |
| *H04L 67/1095* | (2022.01) |
| *H04L 67/025* | (2022.01) |
| *H04L 67/55* | (2022.01) |
| *H04L 67/52* | (2022.01) |
| *G06F 8/65* | (2018.01) |
| *G01C 21/34* | (2006.01) |
| *H04W 8/18* | (2009.01) |

(Continued)

(52) U.S. Cl.
CPC ........ *H04L 67/1095* (2013.01); *G01C 21/343* (2013.01); *G06F 8/41* (2013.01); *G06F 8/65* (2013.01); *G06V 10/10* (2022.01); *H04L 67/025* (2013.01); *H04L 67/18* (2013.01); *H04L 67/26* (2013.01); *H04W 8/18* (2013.01); *H04W 76/10* (2018.02); *H04W 84/12* (2013.01); *H04W 88/02* (2013.01)

(58) Field of Classification Search
CPC ... H04L 67/1095; H04L 67/025; H04L 67/18; H04L 67/26; H04W 76/10; H04W 8/18; H04W 84/12; H04W 88/02; G01C 21/343; G06F 8/41; G06F 8/65; G06K 9/20
See application file for complete search history.

(56) References Cited

U.S. PATENT DOCUMENTS

2009/0282125 A1\* 11/2009 Jeide .................. H04L 67/1095
709/217

\* cited by examiner

*Primary Examiner* — Wing F Chan
*Assistant Examiner* — Joseph R Maniwang
(74) *Attorney, Agent, or Firm* — Baker & McKenzie LLP

(57) ABSTRACT

A mobile computing device may comprise at least one memory that comprises mobile application instructions and a state container. The mobile application instructions may cause a processing device of the mobile computing device to perform operations of: creating, while in an offline mode such that the mobile device is disconnected from a remote application server, a local update packet corresponding to the state container; establishing, via a wireless network, a network connection with the remote application server, thereby causing the mobile computing device to enter an online mode; synchronizing the memory of the mobile computing device with the remote application server, the synchronizing comprising comparing a first timestamp associated with the local update packet with a second timestamp associated with the remote update packet; and initiating display of a graphical user interface representation of the second modified contents of the state container to a user of the user device.

20 Claims, 7 Drawing Sheets

(51) Int. Cl.
*H04W 76/10* (2018.01)
*G06F 8/41* (2018.01)
*G06V 10/10* (2022.01)
*H04W 88/02* (2009.01)
*H04W 84/12* (2009.01)

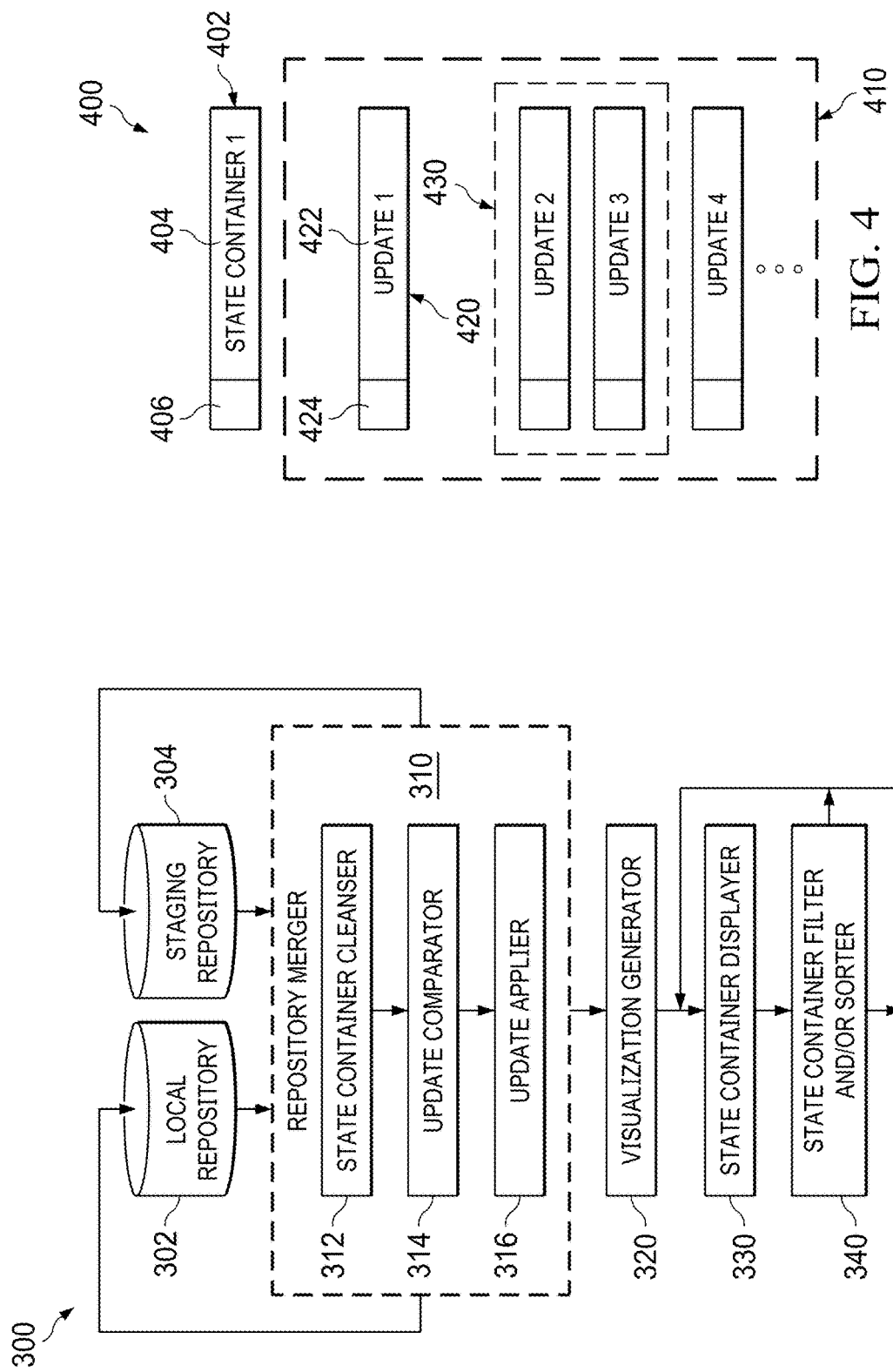

US 11,399,061 B2

STATE CONTAINER SYNCHRONIZATION SYSTEM AND METHOD

CROSS-REFERENCE TO RELATED APPLICATIONS

This U.S. patent application claims priority to and is a continuation patent application of U.S. patent application Ser. No. 16/240,558, filed on Jan. 4, 2019, all of which is incorporated by reference in its entirety.

TECHNICAL FIELD

Embodiments disclosed herein relate to a system and method for synchronizing one or more state containers between one or more computing devices.

BACKGROUND

A computing device may create, read, modify, and/or delete a data structure. A data structure may be configured to be updated and/or displayed. One or more computing devices, that may be connected to or disconnected from a wired or wireless network, may store a data structure associated with the same identity and/or identifier.

SUMMARY

In some embodiments, a mobile computing device may comprise at least one memory comprising mobile application instructions and a state container; a graphics processing unit (GPU); and at least one processing device configured for executing the mobile application instructions, wherein the mobile application instructions cause the at least one processing device to perform operations of: creating, while in an offline mode such that the mobile computing device is disconnected from a remote application server, a local update packet corresponding to the state container, the local update packet associated with a first timestamp; storing the local update packet in the memory of the mobile computing device; detecting the availability of a wireless network; establishing, via the wireless network, a network connection with the remote application server, thereby causing the mobile computing device to enter an online mode; synchronizing the memory of the mobile computing device with the remote application server, the synchronizing comprising: receiving, from the remote application server, a remote update packet corresponding to the state container, the remote update packet associated with a second timestamp; comparing the first timestamp associated with the local update packet with the second timestamp associated with the remote update packet; in response to determining that the first timestamp is earlier than the second timestamp: first modifying contents of the state container based on the local update packet, and second modifying the first modified contents of the state container based on the remote update packet; and initiating display of, using the GPU, a graphical user interface representation of the second modified contents of the state container to a user of the user device.

In some embodiments, the mobile application instructions may cause the at least one processing device to perform the operations of: accessing from the memory of the mobile computing device, prior to receiving the remote update packet from the remote application server, a third timestamp associated with a second remote update packet received by the mobile computing device; and transmitting, prior to receiving the remote update packet from the remote application server, the third timestamp associated with the second remote update packet to the remote application server.

In some embodiments, the mobile application instructions may cause the at least one processing device to perform the operations of: receiving, prior to receiving the remote update packet from the remote application server, a set of remote update packet identifiers and a first set of timestamps corresponding to the set of remote update packet identifiers; accessing, prior to receiving the remote update packet from the remote application server, a third timestamp associated with a chronologically most recent remote update packet received by the mobile computing device; selecting, prior to receiving the remote update packet from the remote application server, a remote update packet identifier from the list of remote update packet identifiers, the selected remote update packet identifier corresponding to a fourth timestamp, such that the fourth timestamp is chronologically nearest to and chronologically later than the third timestamp; and transmitting, prior to receiving the remote update packet from the remote application server, the selected remote update packet identifier to the remote application server.

In some embodiments, the mobile application instructions comprised in the memory may be generated by a cross-platform application compiler.

In some embodiments, the mobile application instructions may cause the at least one processing device to perform an operation of generating a pre-populated state container based on the second modified contents of the state container.

In some embodiments, the mobile application instructions may cause the at least one processing device to perform an operation of displaying, using the GPU comprised in the mobile computing device and using a GPS receiver comprised in the mobile computing device, a map route based on the second modified contents of the state container.

In some embodiments, the creating of the local update packet corresponding to the state container may comprise acquiring an image using a camera sensor comprised in the mobile computing device.

In some embodiments, the receiving of the remote update packet corresponding to the state container may comprise requesting the remote update packet from the remote application server.

In some embodiments, the receiving of the remote update packet corresponding to the state container may comprise receiving a push notification from the remote application server.

In some embodiments, the synchronizing of the memory of the mobile computing device with the remote application server may comprise: determining, after receiving the remote update packet corresponding to the state container, that first data associated with the local update packet is an inverse of second data associated with the remote update packet; setting the second modified contents of the state container substantially equal to original contents of the state container; and ending the synchronizing of the memory of the mobile computing device with the remote application server.

In some embodiments, a non-transitory computer readable medium comprising computer readable code may be provided to perform any of the methods described herein.

BRIEF DESCRIPTION OF THE DRAWINGS

Reference is now made to the following detailed description, taken in conjunction with the accompanying drawings. It is emphasized that various features may not be drawn to scale and the dimensions of various features may be arbi

FIG. 3 shows an exemplary process flow for updating and/or displaying one or more state containers, in accordance with some embodiments of the disclosure;

FIG. 4 shows an exemplary data structure associated with at least one of a state container and an update packet, in accordance with some embodiments of the disclosure;

DETAILED DESCRIPTION

Embodiments described herein may be directed to systems, methods, apparatuses, devices, computer program products, computer-executable instructions, and/or applications for creating, reading, updating, deleting and/or managing one or more state containers. One or more update packets may be associated with the one or more state containers, and may be configured to modify the contents and/or display of the one or more state containers.

In some embodiments, a computing device (e.g. a backend server running an Integrated. Workplace Management System, or AVMS, service) may comprise memory and/or a database storing data. A user device may request data from the computing device, and/or the computing device may "push" data to the user device or otherwise provide the user device data in a proactive (e.g. event-, trigger- and/or time-based) manner.

It may be desirable to synchronize the state container and/or update packet data stored on one or more computing devices (e.g. a first user device, a second user device, a backend server). Upon network disconnection between a first computing device and one or more second computing devices, local data stored on the first computing device may become "out-of-sync" with local data stored on the one or more second computing devices. Upon re-establishment (or first-time establishment) of a network (e.g. computer network) connection between the first computing device and the one or more second computing devices, a method may be employed to synchronize and/or re-synchronize at least a portion of the local data stored on the first computing device and the one or more second computing devices. Additionally or alternatively, state container and/or update packet data may be stored, referenced, and/or transmitted in a manner that reduces computational load and/or computational latency relative to naïve synchronization methods.

Figure 1:
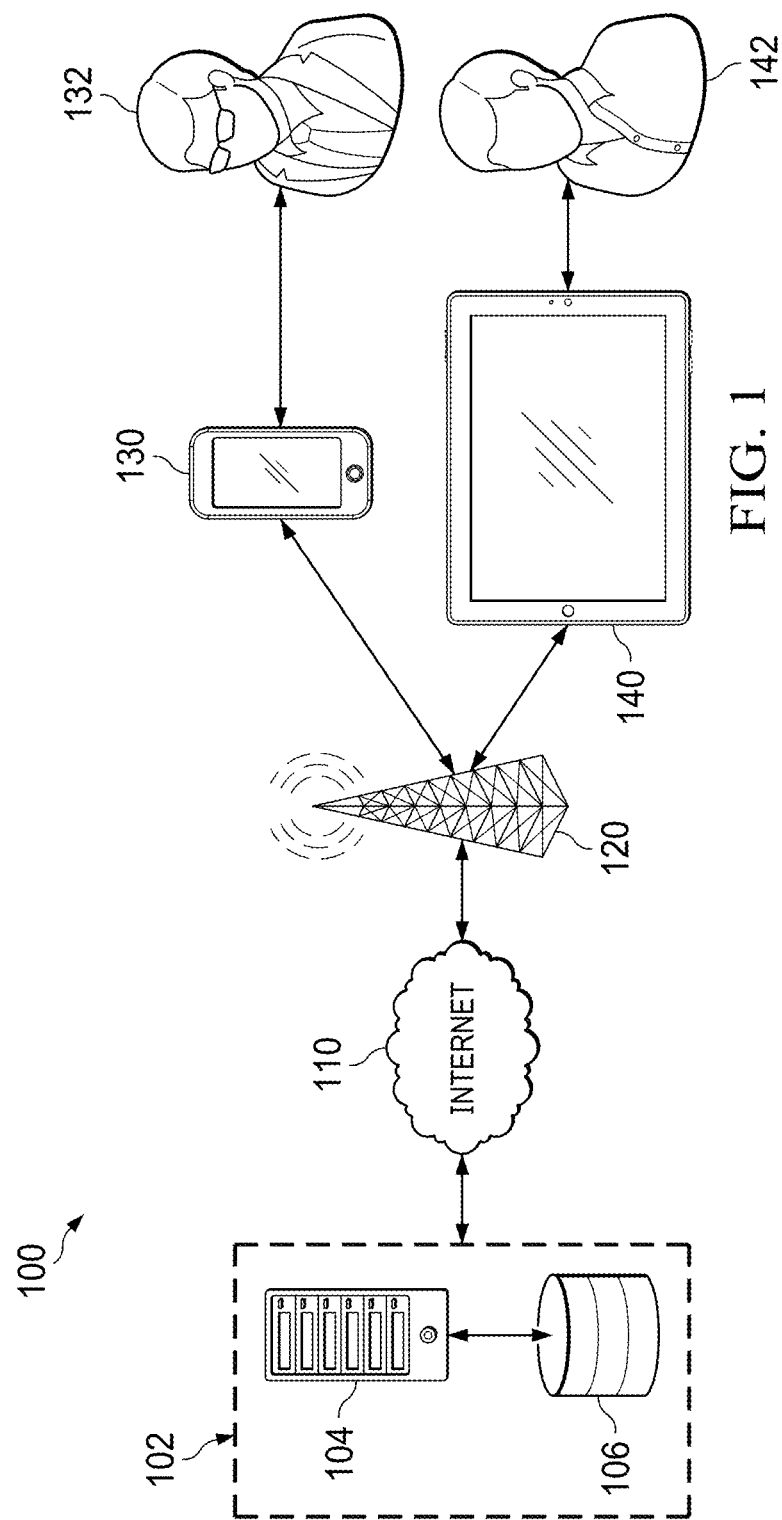
- FIG. 1 shows an exemplary network associated with one or more computing devices storing one or more state containers, in accordance with some embodiments of the disclosure.

As illustrated in FIG. 1, an associated network 100 may comprise a backend server 102 (which may in turn comprise a computing device 104 and a database 106), a public network 110 (e.g. the Internet), a communication link 120, one or more user devices 130, 140, and/or users 132, 142 of user devices 130, 140. For example, a backend server 102 may perform operations on state container data. (e.g. based on update data), organize state container and/or update data, and/or serve as a data transceiver to a remote user device 130, 140. A user device 130, 140 may comprise a smartphone, tablet, personal computer, smartwatch, smart ring, terminal, mobile computing device, and/or any other computing device. In some embodiments a public network 110 may comprise a local area network (LAN), wide area network (WAN), corporate network, enterprise network, private network, and/or government network. In some embodiments, a communication link 120 may be wired (e.g. comprising fiber optic cables) and/or wireless (e.g. comprising a cellular network tower). For example, a mobile computing device may comprise a wireless transceiver configured to communicate with a wireless receiver (e.g. a base station, a WiFi router), Data transmitted wireless y to and from the wireless receiver may be further relayed to a second computing device (e.g. a backend server) via a wired network, backbone network, Internet, local network, and/or the Internet. Data, packets, and/or other information may be passed bi-directionally between the backend server 102 and a user device 130, 140. In some embodiments, a backend server 102 and/or a computing device 104 thereof may comprise a server, a data center, an application server, a remote server, a remote application server, an enterprise server, a third-party server, and/or a third-party network. A database 106 may be comprised within the computing device 104 (e.g. as computer memory) and/or may be accessed remotely from the computing device 104. The data, packets, and/or information of a database 106 may be encrypted, stored in a linked list, stored in a hash table, stored hierarchically, stored according to data type, stored according to user and/or enterprise association, and/or managed by a third-party. In some embodiments, a user device 130, 140 may communicate with a backend server 102 via an encrypted channel. In some embodiments, a user device 130, 140 may determine an appropriate backend server to communicate with before transmitting data and/or sending requests, in some embodiments, a user device 130, 140 may provide a hardware identifier (e.g. a MAC address), a user profile associated with the user device 130, 140 and/or an organization associated with the user device 130, 140. In some embodiments, a backend server 102 and/or user device 130, 140 may require a password, location information, identity, and/or authenticating information before initiating a communication channel. In some embodiments, a backend server 102 and/or software application running thereon may request a user device identity and/or the identity of the profile and/or user associated with the user device 130, 140 in order to appropriately route requests (e.g. to an organization-specific computing device) and/or store data (e.g. on an organization- and/or application-specific database). In some embodiments, update data may be referred to as update packets.

Figure 2:
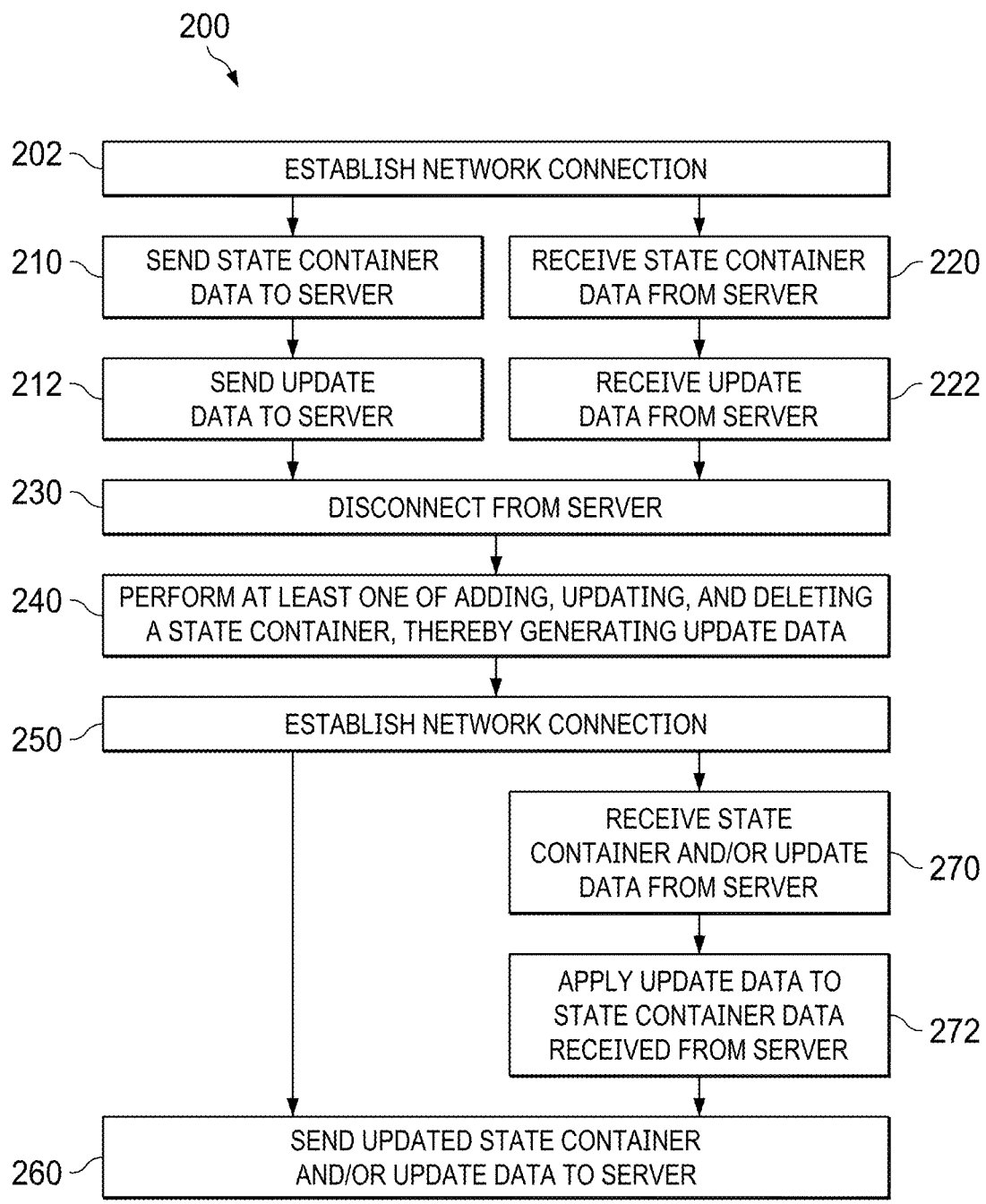
FIG. 2 shows an exemplary method for updating one or more state containers, in accordance with some embodiments of the disclosure.

Some embodiments of a user device and/or user device application may comprise execute some, all, or none of the steps 200 illustrated in FIG. 2. The steps 200 may be executed in any order, and may be performed by a mobile computing device and/or any other computing device in communication with a backend server, application server, remote processing data center, etc. Alternatively or additionally, the steps 200 may be performed and or executed by a server and/or remote computing device in communication with another computer device and/or mobile computing device. For example, as illustrated, a computing device may establish a network connection 202, e.g. with a backend server. Establishing a network connection 202 may comprise connecting to a wireless and/or wired communication link, providing computing device identification information, providing a password and/or key, specifying the address (e.g. IP address) of a server to communicate with, performing a handshake routine to verify that a connection was established, encrypting the communication channel between the computing device and a server (e.g. to avoid third-party eavesdropping and/or communication interference), and/or sending and/or receiving a "heartbeat" signal (e.g. in order to verify existence of the network connection). Additional steps may comprise a computing device sending state container and/or update data to the server 210, 212. Additionally or alternatively, a computing device may receive state container and/or update data from the server 220, 222. For example, upon establishment of a network connection between a computing device and a server, a computing device may request and/or receive state container and/or update data from a server. Alternatively or additionally, a server may pro-actively "push" state container and/or update data to a computing device (e.g. triggered by establishment of a network connection, a scheduled time, an identification of new data, a creation of new data, and/or a comparison with data stored on a computing device). As another example, a computing device may send state container and/or update data to a server Sending and/or receiving of state container and/or update data may comprise sending the data itself, sending a copy of the data, sending a representation (e.g. a summary) of the data, sending identifiers (e.g. packet number) associated with the data, sending metadata associated with the data (e.g. data type), sending timestamps associated with the data (e.g. corresponding to when the data was created), sending a reference (e.g. directory and/or network address) associated with the data, and/or sending a compressed and/or encrypted formed of the data (e.g. requiring a key and/or password to decrypt). Transmission of state container and/or update data between a computing device and a server (e.g. remotely located) may facilitate synchronization of a memory state, data state, and/or application state of the computing device and the server.

In some embodiments, a computing device may disconnect from a server 230 and/or network, after which the computing device may perform at least one of adding, updating, and deleting a state container, which may thereby generating update data 240. For example, an "add state container" update operation may be created, which may cause the computing device to create a state container according to the update operation. As another example, a computing device may create and/or receive (e.g. by a user of a computing device) an update operation that may be assigned and/or applied to the state container. For example, an update operation may modify the contents of the state container upon application to the state container, and/or an update operation may add contents to the state container (e.g. a metadata tag, a comment, and/or a new sub-contents of the state container). As another example a computing device may generate and/or receive a delete operation, which may be applied to an entire state container, the contents (or a subset thereof) of a state container, and/or an update operation associated with and/or applied to the state container. Update data and/or operations created, generated, received, and/or performed by a computing device disconnected from a server may be referred to as taking place in an "offline mode". In an offline mode of a computing device, data inconsistencies and/or data conflicts between the computing device and other remote computing devices (e.g. a remote application server) may occur. For example, a state container may be comprised in both a server (and/or a database thereof) and a computing device, but update data generated and associated with the state container during an offline mode may not be reflected on the server (and/or the database thereof) at that time. It may be beneficial to reconcile, resolve, and/or correct such data inconsistencies and/or conflicts upon establishment and/or re-establishment of a network connection between the computing device and a remote computing device (e.g. a server), A data conflict may occur when one or more update packets are stored out of order, processed out of order, received out of order, inconsistent with one or more second update packets stored on a second computing device, and/or contradictory (e.g. if a later update packet modifies the configuration of an update packet and/or state container that does not exist locally).

A further step may comprise establishing (and/or re-establishing) a network connection 250 (e.g. with a remote computing device and/or server). Upon establishing (and/or re-establishing) a network connection, a computing device may send an updated state container and/or update data to a remote computing device (e.g. a server) 260. Alternatively or additionally, prior to step 260 a computing device may receive state container and/or update data from a server 270 (e.g. upon request, or by a transmission initiated by the server), and/or may apply update data to the state container received from the server 272. For example, after establishing a network connection with a server, a computing device may request the most recent data from the server. The computing device may then reconcile the received server data with the computing device's local state container and update data. After determining the current state of a state container (e.g. by applying remote and local update data to the state container), the computing device may then transmit the state container and/or update data to a server (as illustrated in step 270), thus completing a synchronization process.

The method of FIG. 2 and/or a similar method may be referred to as a "smart sync". A smart sync may only download to a computing device data, contents, state containers, update packets, and/or metadata that the computing device does not already store locally. In order to perform a smart sync, a first computing device may request and/or receive a set of a metadata from a second computing device. The second computing device may then compare the set of metadata with the local memory e.g. the state containers and/or update packets thereof) of the second computing device to determine which, if any, of the data on the first computing device is not stored on the second computing device. Alternatively or additionally, the second computing device may determine which, if any, of the data on the second computing device is not stored on the first computing device. The second computing device may then request data from, receive data from, and/or transmit data to the first computing device based on the determined difference in data storage between the first computing device and the second computing, and other factors (e.g. it may not be desirable to fully synchronize the local data stores of the first computing device and the second computing device, e.g., if one of the computing devices only needs a subset of the information for a local software application).

FIG. 3 illustrates an example embodiment of a system implemented on a computing device (e.g. a mobile computing device and/or server) for generating and/or modifying display of a state container. A local repository 302 may store state containers and/or update packets generated and/or locally stored on a mobile computing device, A staging repository 304 may store state containers and/or update packets received from a remote computing device (e.g. a server), and/or may serve as a "sandbox" and/or "scratchpad" in memory for modifying and/or manipulating one or more state containers. For example, a repository merger 310 may receive data (e.g. state containers and/or update packets) from at least one of a local repository 302 and a staging repository 304. A repository merger 310 may comprise a state container cleanser 312, an update packet comparator 314, and/or an update packer applier 316. For example, a state container cleanser may remove, delete, roll back, and/or revert any update operations applied to a state container (e.g. such that the state container is reduced to a "default", "stateless", and/or "core" state). An update comparator 314 may determine which updates should be applied to a state container by an update packet applier 316 (if any), and if so, in what order. For example, timestamps, sequence numbers, and/or queue ordering may be accessed in order to determine a proper application sequence of update packets, and/or whether some or all update packets should be ignored and/or discarded (e.g. if the one or more update packets are obsolete, out-of-date, superseded, cancelled, and/or nullified by one or more other update packets). A queue may be first-in first-out (FIFO) and/or last-in first-out (LIFO). Queueing of update packets may be prioritized (i.e. may not strictly adhere to a FIFO and/or LIFO regime) based on the type of update packet, the one or more state containers associated with an update packet, the user profile associated with the one or more update packets, and/or computing device generating and/or sending the update packet.

In general, state containers and update packets may be stored separately and not combined and/or associated until a visualization and/or data processing request is made by a user of a user device (or until a computing process makes such a request). Delaying the application of update packets to state containers until requested by a user may allow for more efficient data storage (e.g. may not need to re-arrange blocks of memory), data transfer (e.g. may only need to transmit new update packets instead of entire state container), and/or data processing (e.g. may not need to apply one or more update packets to a state container if a later update packet, such as an inverse update packet, makes an earlier update packet moot, void, not applicable, and/or deleted). In some embodiments state containers may have at least a subset of associated update packets applied during data storage, state container transmission, data retrieval, data indexing, and/or graphical user interface (GUI) visualization.

Following application of one or more update packets to one or more state containers, a visualization generator 320 and/or visualization compositor may generate a visualization (e.g. an image, bitmap, graphical user interface, and/or multimedia display) of the one or more state containers with the one or more update packets applied. A visualization composite (e.g. generated by a visualization compositor) may be generated based on one or more images, state containers, update packets, and/or other data applied (e.g. to an image buffer, CPU memory, and/or a display screen) in a sequential order, such that an earlier image may be at least partially overlapped with a (opaque, partially transparent, and/or transparent) later image based on the one or more images, state containers, update packets, and/or other data. A visualization generator 320 may be comprised within a processing device of a computing device (e.g. mobile computing device), a graphics processing unit (GPU) of a computing device (e.g. mobile computing device), and/or an external computing device. A state container displayer 330 may then display the generated visualization of the state container. The computing device (e.g. a mobile computing device) may then utilize a state container filter and/or sorter 340 to update the display of the state container (e.g. based on a user command to visualize the most salient state containers and/or the most salient state container contents thereof). A state container updater 350 may then generate and/or apply additional updates to the one or more state containers, or the display thereof (e.g. based on a user command and/or a triggered condition), before the state container displayer 330 (e.g. a GPU, LCD screen, and/or image buffer thereof) updates the display of the state container.

FIG. 4 illustrates a possible data structure for a state container 402 and/or update packets 410. A state container may comprise a header and/or metadata partition 406 and/or a body and/or contents partition 404. For example, a header 406 may comprise an identifier, identification number, queue number, sequence number, category identifier, group identifier, timestamp, date, set of associated state containers, set of associated update packets, a user device identifier, an originator identifier, an organizational identifier, a recipient identifier, a version identifier, and/or data affecting the display of the state container 402. A body 404 of a state container 402 may comprise a state container type, state container contents, update packets, results of applying one or more update packets, graphical user interface data, graphical display data, update packet history, contents history, and/or task information. Alternatively or additionally, data comprised in a header 406 may be comprised in a body 404, and vice versa.

Update packets 410 may be stored in a contiguous data structure and/or may be stored separately. For example, update packets corresponding to one or more state containers may be stored in a single data structure, a linked list, various referenced storage locations, a database, a hash table, an associative array, and/or a tree. An update packet 420 may comprise a header 424 and/or metadata portion, and/or a body 422 and/or contents portion. The header 424 and body 422 portions of an update packet 420 may store information similar and/or identical to the information stored in the respective portions 46, 404 of a state container 402. Alternatively or additionally, a header 424 of an update packet 420 may comprise a timestamp, sequence number, one or more state container identifiers, update packet group identifier, update packet priority data, and/or data affecting application of an update packet to one or more state containers. A body 422 of an update packet 420 may comprise update data, an update operation, a date, a time, an appointment, a comment, a task, a characteristic, an image, a notification, a value, a maintenance status, and/or inventory data. Data comprised in a header 424 of an update packet 420 may be comprised in a body 422 of an update packet 424, and vice versa. Additionally or alternatively, a set of update packets 430 may be grouped in memory and/or via a list of address locations (e.g. for grouping similar types of updates, updates that need to be applied to a state container in a particular order and/or with a particular priority, updates that correspond to one or more state containers, and/or update packets that can be ignored).

Figure 5:
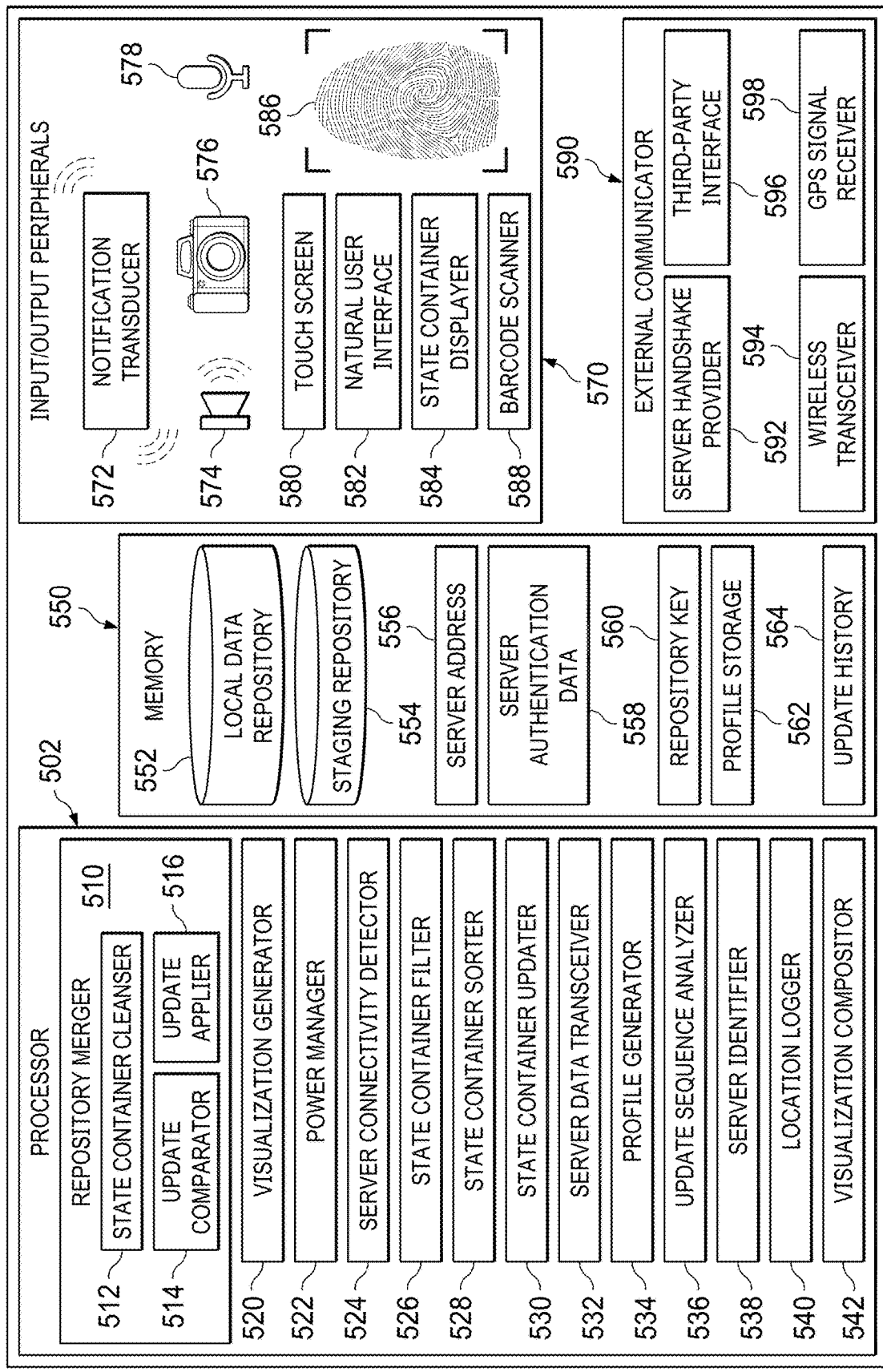
FIG. 5 shows an exemplary computing environment associated with a computing device, in accordance with some embodiments of the disclosure.

FIG. 5 illustrates a possible embodiment of a computing device 500 (e.g. a user device and/or mobile computing device), A computing device 500 may comprise a processor 502, a memory 550, input/output (I/O) peripherals 570, and/or an external communicator 590. A processor may comprise a repository merger 510 (which may in turn comprise a state container cleanser 512, update packet comparator 514, and/or update packet applier 516), a visualization generator 520, a power manager 522, a server connectivity detector 524, a state container filter 526, a state container sorter 528, a state container updater 530, a server data transceiver 532, a profile, generator 534, an update packet sequence analyzer 536, a server identifier 538, a location logger 540, and/or a visualization compositor 542. A memory may comprise a local repository 552, a staging repository 554, one or more server addresses 556, server authentication data 558, one or more repository keys 560, profile storage 562, and an update history 564. I/O peripherals may comprise a notification transducer 572, an audio speaker 574, a camera 576, a microphone 578, a touch screen 580, a natural user interface 582, a task displayer 584, a fingerprint scanner 586, and/or a barcode scanner 588. An external communicator 590 may comprise a server handshake provider 592, a wireless transceiver 594, a third-party interface 596, and/or a GPS signal receiver 598.

A repository merger 510 may perform actions and provide features similar to the repository merger 310 of FIG. 3. A visualization generator 520 may take multiple state container, update packet, and/or user-provided inputs, and in response generate a visualization (e.g. a chart of data associated with a state container, a list of state containers and/or associated update data). A power manager 522 may monitor and/or regulate power provided to at least one of a device processor, display, external communicator, and/or any other computing subcomponent identified in FIG. 5 or FIG. 6. A server connectivity detector 524 may detect computing device 500 connectivity to a local and/or remote server. A state container filter 526 may receive one or more inputs for filtering state containers accessed and/or displayed, and/or may select a subset of state containers from a data structure based on one or more parameters (e.g. input parameters). A state container sorter 528 may re-order a storage of state containers in a data structure (e.g. by moving one or more state containers to one or more new memory locations, and/or by modifying a reference address associated with the storage location of one or more state containers). A state container updater 530 may modify one or more state containers and/or the contents thereof based on one or more update packets, input parameters, trigger functions, and/or other data. A server data transceiver 532 may transmit data to and/or receive data from a local and/or remote server. For example, a server data transceiver 532 may packetize, compress, wrap, encrypt, and/or prepare data for transmission to a server (e.g. according to an API, communication protocol, and/or handshake mechanism). A server data transceiver 532 may similarly receive and/or interpret data (e.g. packetized, compressed, and/or encrypted data) from a server. A profile generator 534 may create one or more state containers and/or update packets. Additionally or alternatively, a profile generator 534 may create and/or facilitate the creation of a profile associated with a user device, set of state containers, set of update packets, display of state containers, and/or a remote server. An update sequence analyzer 536 may determine the order and/or sequence of update packets generated, transmitted, received, and/or applied. Additionally or alternatively, an update sequence analyzer 536 may process one or more update packets based on the sequence, ordering, priority, and/or content associated with the one or more update packets. For example, an update sequence analyzer 536 may determine that a first update packet adds a data structure to a state container, while a second (e.g. subsequent) update packet deletes the same data structure, in response, the update sequence analyzer 536 may ignore the first update packet and the second update packet, and/or may delete and/or re-assign in memory the first and the second update packets based on their "complementary" and/or "cancelling out" relationship. A server identifier 538 may determine the identity of one or more servers (e.g. remote and/or backend servers) and/or other computing devices. For example, a server identifier 538 may be used to determine an appropriate server and/or the appropriate address (and/or associated transmission protocol) prior to transmitting a state container and/or an update packet to the server, Additionally or alternatively, a server identifier 538 may determine the identity of the source and/or server of received data (e.g. one or more state containers and/or update packets). A location logger 540 may determine, store, analyze, and/or log the location of the computing device 500 (e.g. during the creation and/or modification of one or more state containers and/or update packets) and/or the location of actions (e.g. modifications) performed on one or more update packets and/or state containers, A visualization compositor 542 may act independently and/or in tandem with a visualization generator 520 in order to generate, create in memory, and/or display a visualization of one or more state containers and/or update packets. For example, a visualization compositor 542 could be comprised in a GPU (graphics processing unit) and/or could use a frame buffer (e.g. memory of a. GPU) to store images and/or apply subsequent images and/or overlays for display.

A local data repository 552 may contain one or more state containers and/or update packets that were generated and/or modified on the computing device 500, and/or were locally stored after being received on the computing device 500 (e.g. received from an external server). A staging repository 554 may serve as "scratch space" for modifying (e.g. by applying one or more state containers), analyzing (e.g. the contents of a state container and/or associated update packets), and/or storing one or more state containers and/or update packets (e.g. temporarily, permanently, and/or until the one or more state containers and/or update packets are merged and/or transferred to a local data repository 552). A server address 556 may comprise an address (e.g. IP address, memory address) of one or more computing devices associated with transmitting state containers and/or update packets to, and/or receiving state containers and/or update packets from. Server authentication data 558 may be used and/or required to validate the appropriateness and/or security of a server and/or remote computing device, and/or may be used and/or required to gain access to and/or communicate with a server and/or remote computing device. A repository key 560 may, serve a purpose similar to server authentication data 558 (e.g. may be used to decrypt and/or unlock data stored remotely and/or received locally). Profile storage 562 may store one or more profiles associated with a user device, user profile, set of state containers, and/or set of update packets. An update history 564 may record and/or store the sequence and/or results (e.g. the timestamps, inputs, outputs, and other metadata thereof) associated with a sequence of update packets and/or the application of a sequence of update packets to one or more state containers.

A notification transducer 572 (e.g. a vibrator, LED indicator, and/or audio indicator) may indicate to a user of a computing device 500 that one or more actions and/or activities have taken place (e.g. one or more state containers and/or update packets received, a new state container has been associated with a user profile, server connectivity has been established, Internet connectivity has been re-established, and/or a new update, packet has been applied to one or more state containers). An audio speaker 574 may provide an aural message associated with operations occurring on the computing device 500. An image sensor 576 (e.g. a camera) may be used to acquire one or more images and/or videos, which may then be associated with one or more state containers and/or update packets. For example, an image depicting an object associated with a state container may be used in the visualization of a state container. Additionally or alternatively, an image may be stored and/or packaged in one or more update packets in order to be applied to one or more state containers. A microphone and/or acoustic sensor 578 may detect and/or record an audio sequence for authentication, documentation, and/or computing device interaction purposes. A touch screen 580 may provide an interface for a user to navigate and/or control computing instructions executed on the user device. A natural user interface 582 (e.g. a distance sensor, a motion sensor, a tilt sensor, an orientation sensor, an accelerometer) may provide an alternative or additional mechanism for a user to interact with the computing device. A state container displayer 584 (e.g. an LCD screen, one or more LEDs, a projector) may display one or more state containers, contents associated with the one or more state container, and/or update packet data associated with the one or more state containers. A fingerprint sensor 586 may scan, read, image, and/or analyze a user fingerprint, e.g. for authentication, identification, and/or documentation purposes. A barcode scanner 588 may read, scan, image, and/or analyze one or more barcodes (e.g. a barcode printed on a paper, a barcode affixed on an object) for authentication, identification, tracking, and/or documentation purposes.

A server handshake provider 592 may define, satisfy, respond to, analyze, and/or transmit in accordance with a communication protocol between the computing device 500 and one or more other local and/or remote computing devices (e.g. a server). A wireless transceiver 594 may transmit and/or receive wireless signals for communication (e.g. via a cellular network) and/or location (e.g. as a GPS receiver) purposes. A third-party interface 596 may interact with a third-party computing device, e.g. by receiving data according to an application protocol interface (API) and/or transmitting data according to an application protocol interface (API). A CIPS signal receiver 598 may receive, process, and/or analyze one or more wireless signals (e.g. from a satellite transmitter) for location and/or positioning purposes.

Figure 6:
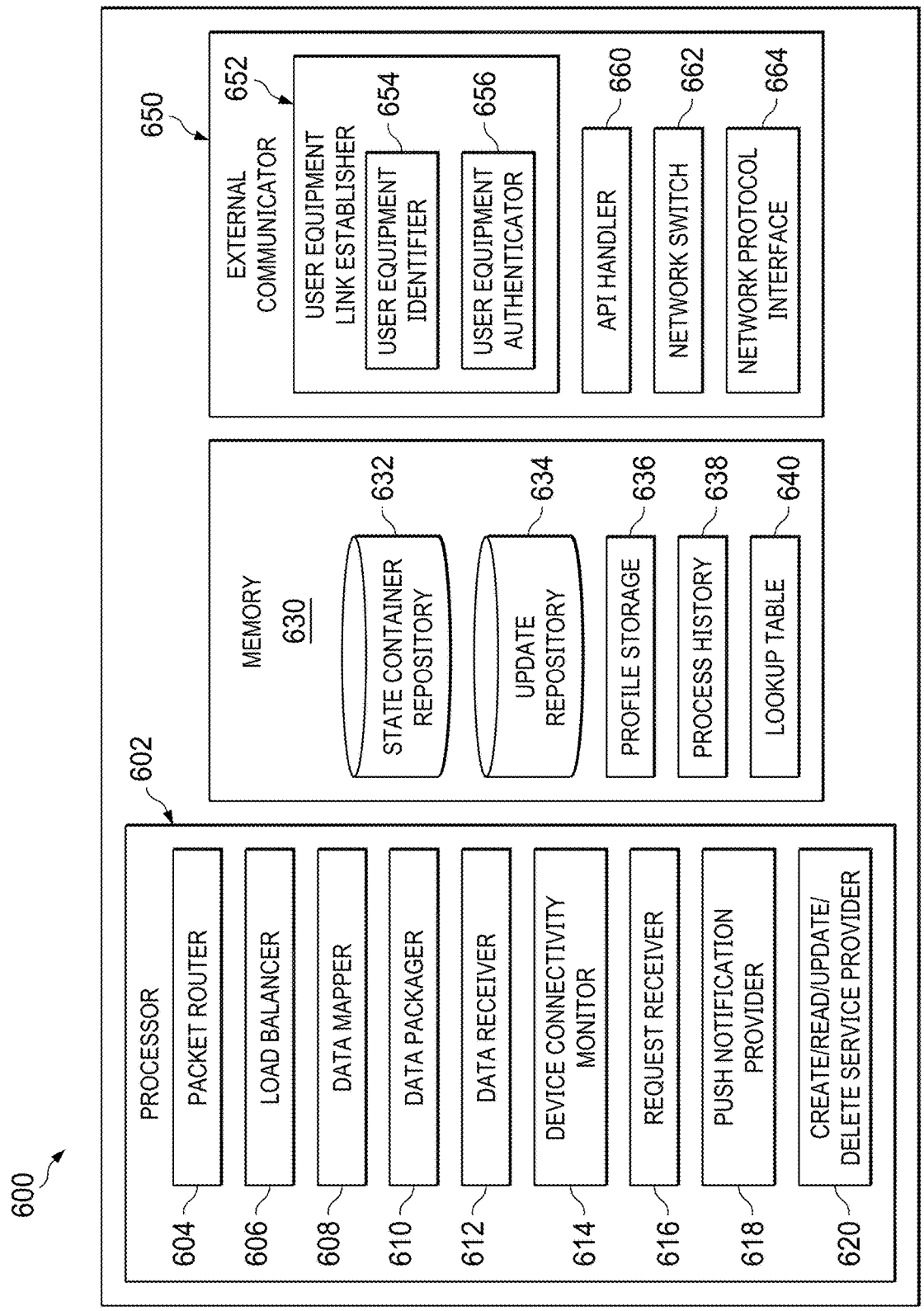
FIG. 6 shows an exemplary computing environment associated with a computing device, in accordance with some embodiments of the disclosure.

FIG. 6 illustrates an example embodiment of a computing device 600 (e.g. a server and/or a remote application server). A computing device 600 may comprise a processor 602, memory 630, and/or an external communicator 650. A processor may comprise a packet router 604, a load balancer 606, a data mapper, 608, a data packager 610, a data receiver 612, a device connectivity monitor 614, a request receiver 616, a push notification provider 618, and/or a create/read/update/delete (CRUD) service provider 620. One or more memory devices may comprise a state container repository 632, an update packet repository 634, profile storage 636, process history 638, and/or one or more lookup tables 640. An external communicator may comprise a user equipment link establisher 652 (which may in turn comprise a user equipment identifier 654 and/or a user equipment authenticator 656), an API handler 660, a network switch 662, and/or a network protocol interface 664.

A packet router 604 may comprise computing instructions and/or a computing device for routing one or more packets to an appropriate destination, either within or outside of the computing device 600. For example, a packet router 604 processing incoming messages may determine the appropriate state container for an incoming update packet, and/or may determine an a appropriate grouping and/or storage location to assign a state container data structure to. A load balancer 606 may monitor, detect, measure, analyze, and/or control processing of data (e.g. de-packetization of incoming data, application of update packets to state containers, and/or transformation of state containers, etc.). A data mapper 608 may assign, store, and/or allocate data to appropriate locations in memory. Additionally or alternatively, a data mapper 608 may modify and/or re-packetize data in order to configure the data (e.g. an update packet) to be stored with or near, and/or to be associated with appropriate second data (e.g. a state container). A data packager 610 may packetize and/or allocate data to memory based on a protocol, packet structure, and/or data structure definition. A data receiver 612 may be configured to monitor, analyze and/or process incoming data (e.g. data packets formatted according to a specific protocol). A device connectivity monitor 614 may determine if a remote (and/or local) computing device 500 is connecting to the computing device 600 (e.g. a server). For instance, in the case lack of connectivity is detected, when connectivity is re-detected, the computing device 600 may request data, update packets, and/or state containers added, deleted, and/or modified during the period of lack of connection. A request receiver 616 and/or handier may monitor, receive, process, and/or analyze a request from a computing device 500, 600. For example, a mobile device may request the computing device 600 to provide data (e.g. update packets and/or state containers). A push notification provider 618 may transmit data, packets, messages, and/or notifications to a user device (e.g. a mobile device). For example, a push notification may be sent to a second computing device to inform the computing device that server connectivity has been established; that a new state container and/or update packet has been transmitted to the user device; and/or that one or more state containers and/or update packets located on the user device have been modified. A create/read/update/delete (CRUD) service provider 620 may perform a creation, deletion, and/or modification of one or more update packets and/or state containers (e.g. based on a user request, according to scheduled instructions, according to a conditional trigger function). Additionally or alternatively, a CRUD service provider 620 may handle a request for a read operation, e.g. by returning data corresponding to the contents associated with at least one of a state container and/or update packet.

A state container repository 632 may store one or more state containers. For example, a state container repository 632 of the computing device 600 may serve as a "ground truth" for one or more second computing devices (e.g. user devices and/or mobile devices) connected to the computing device 600. In other words, the one or more second computing devices may synchronize their local data (e.g. state containers and/or update packets) to the data stored in the state container repository. Alternatively or additionally, a state container repository 632 may serve as a long-term storage location for data not commonly used on a remote user device and/or mobile device. Alternatively or additionally, a state container repository 632 may store data (e.g. state containers, modifications to state containers, and/or update packets associated with state containers) provided by one or more first user devices and/or mobile devices, such that one or more second user devices and/or mobile devices may synchronize with the provided data (e.g. either immediately, and/or at a delayed time when the one or more second user devices and/or mobile devices reconnects to the computing device 600). An update repository 634 may serve a similar function to a state container repository, except that an update repository may exclusively contain update packets. In other embodiments, the update repository 634 may store state container data and/or other data. Profile storage 636 may store and/or facilitate management of one or more profiles (e.g. user profiles), which may be associated with one or more state containers and/or update packets. Process history 638 may record, store, and/or log transmissions, receptions, operations, modifications, additions, deletions, and/or requests associated with the computing device 600 and/or one or more second computing devices (e.g. user devices and/or mobile devices A lookup table 640 may store a mapping table, hash table, mapping function, and/or retrieval instructions for acquiring data (e.g. state containers and/or update packets) according to a request and/or a procedure to be performed.

A user link equipment establisher 652 may facilitate the establishment of a network link (e.g. wired and/or wireless) between the computing device 600 and/or one or more remote computing devices. A user equipment identifier 654 may determine the identity of a remote computing device attempting to communicate with, and/or communicating with the computing device 600 (e.g. for authentication, monitoring, logging, mapping, and/or routing purposes). A user equipment authenticator 656 may determine if a remote computing device attempting to communicate with and/or communicating with the computing device 600 is authorized to communicate with the computing device 600 and/or whether the attempted operation is allowed. An API handler 660 may package and/or unpack incoming and/or outgoing data, e.g. according to an application protocol interface (API), A network switch 662 may facilitate routing of incoming and/or outgoing data to the appropriate endpoint. A network protocol interface 664 may serve transmit and/or receive data according to a network protocol.

Figure 7:
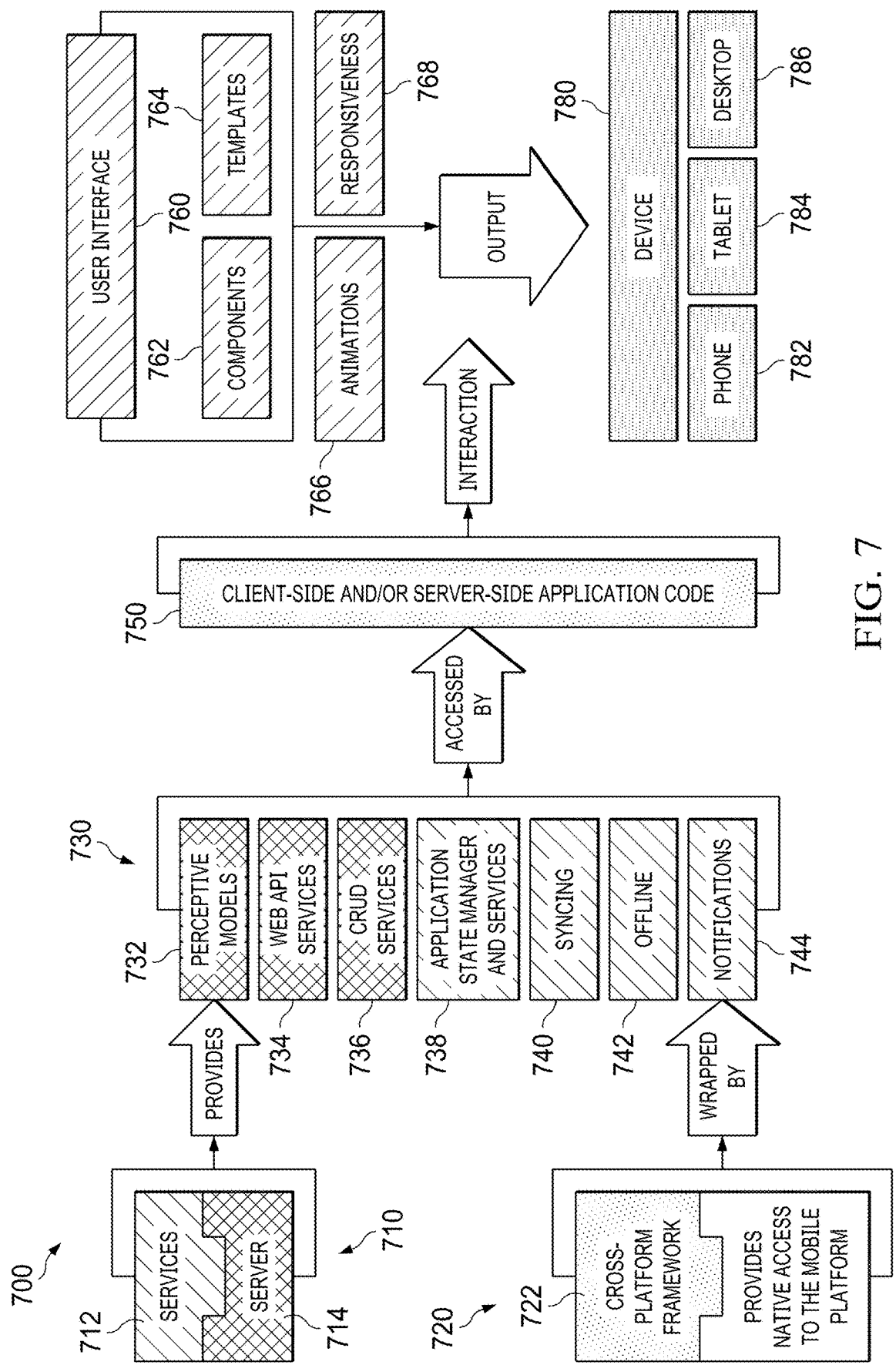
FIG. 7 shows an exemplary system for updating and/or displaying one or more state containers, in accordance with some embodiments of the disclosure.

FIG. 7 illustrates an example embodiment of a system 700 for communication between a computing device and a server. The system may comprise a remote server 710, comprising a server 714 providing one or more services 712. An associated application may be generated by and/or interact with a cross-platform plug in 720, which in turn may comprise a cross-platform framework. Features 730 provided by the system may comprise perceptive models 732, web API services 734, create/read/update/delete (CRUD) services 736, an application state manager and associated services 738, synchronization 740, offline capability 742, and/or notifications 744. Application code may be accessed by, wrapped by, generated by, and/or interpreted from client-side and/or server side application code 750. Interaction with the system may take place on a computing device 780 (e.g. a smart phone 782, tablet 784, and/or desktop 786) via a user interface 760, graphical user interface (GUI) components 762, templates 764, animations 766, and/or application responsiveness 768. A user interface 760 (and/or the components 762, templates 764, and/or animations 766 thereof) may be proactive, e.g. in order to increase responsiveness 768. For example, a proactive user interface may update user interface elements (e.g. components, templates, and/or animations) as new information related to the user interface elements is received. That is, upon data being received by the computing device and/or upon data output being produced by the device, one or more user interface dements (e.g. a visual icon) may be modified and/or data associated with one or more user interface elements may be cached and/or stored in random access memory (RAM) for quicker retrieval of the user interface element data upon an action performed by a user of the user device. In some embodiments, user interface elements may be referred to as observables. Additionally or alternatively the user interface may be comprised in a reactive and/or pro-active user application and/or mobile application. In some embodiments, a user interface 760 may be reactive (e.g. may only retrieve and/or generate user interface contents such as visual, audio, and/or haptic output upon request, trigger, and/or initiation by a user of a user device).

Figure 8:
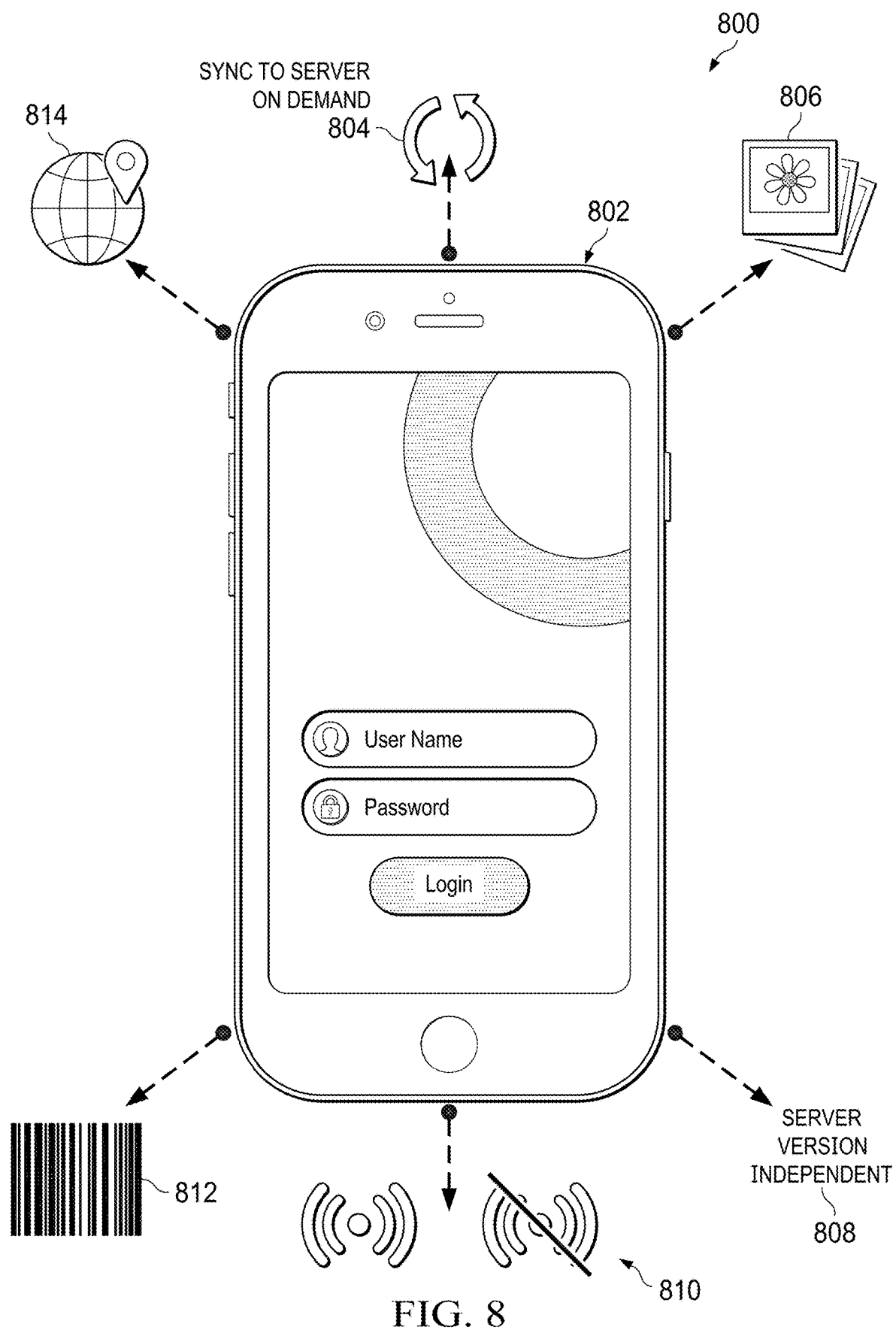
FIG. 8 shows an exemplary computing environment associated with a computing device, in accordance with some embodiments of the disclosure.

FIG. 8 illustrates a possible mobile computing device environment 800 and/or features thereof. A mobile computing device 802 may comprise input/output peripherals and/or a visual display for displaying one or more state containers (e.g. after one or more updates are applied). A mobile computing device environment 800 may comprise a "synchronization to server on demand" feature 804, an image and/or photographic documentation capabilities 806, server version independence capabilities 808 (e.g. may support multiple server software application versions and/or may employ an API that accommodates one or more server software application versions), online and offline accessibility 810, a barcode scanner 812, integration with location data and/or maps 814, and/or voice-to-text functionality.

In some embodiments, a state container may comprise one or more data structures configured to facilitate the updating, synchronization, and/or display of the state container contents. For example, a state container may comprise a state container type, an identifier, and/or one or more references (e.g. memory addresses) to state container contents. However, contents associated with the state container may be stored in one or more update packets and/or other external data structure. Therefore a state container may serve as a placeholder to be modified by additional data (e.g. update packets), such that the additional data may be retrieved and processed upon a read and/or display operation of a state container in order to account for any recent data associated with the state container. This method may be more efficient than storing the state container contents directly within the data structure of the state container, as it may allow an arbitrary number of additions, deletions, and/or removal of state container-associated contents within requiring significant computer memory re-organization, re-assignment, and/or re-allocation, in some embodiments, a state container may store its contents directly within its data structure (e.g. adjacent in memory, or in contiguous memory). In the case when a state container stores contents directly within its data structure, modifications to its contents may require re-organization of the computer memory associated with the state container data structure. Additionally or alternatively, modifications to the contents may cause deletion and/or ignoring of an original portion of contents that is modified, and addition and/or appending of a new portion of contents (if it exists). The contents of a state container may be distributed among one or more devices, and/or may be fully localized (i.e. stored locally) on at least one computing device. One or more portions of content associated with one or more state containers may be inverse data and/or inverse operations. For example, a first portion of contents (e.g. an update packet) may add specific feature and/or assign a specific value to a state container. A second portion of contents (e.g. a second update packet) may delete and/or remove the specific feature and/or un-assign the specific value from the state container. In this scenario, the first portion of contents and the second portion of contents may be considered to be inverse portions of contents and/or inverse, operations. In some embodiments, a state container may correspond to, comprise, and/or represent a task (e.g. facilities management task). In some embodiments, a state container ma be considered "stateless" in that a state container on its own does not contain state, but only inherits state based on one or more associated update packets that are applied to the state container (e.g. upon state container access, synchronization, and/or visualization). In some embodiments, a user may initiate the creation of a state container (e.g. on the device side, client side, and/or server side). Alternatively or additionally, a user may create and/or modify updates to be applied to one or more state containers.

In some embodiments, an update packet may comprise a data structure, a packet, contiguous computer memory, and/or a remote memory location referenced by an address. An update packet may comprise a header (e.g. for associating the update packet with a time, one or more state containers, and/or one or more second update packets). An update packet may be stored and/or encoded in order to facilitate application of the update packet to one or more state containers. For example, an update packet may comprise am update type identifier in order to inform an update applier how to apply the update packet to the one or more state containers. In some embodiments, an update packet may be referred to as a task, operation, transform, and/or procedure.

State containers and/or update packets may be encrypted, compressed, duplicated, copied, distributed in memory, co-located in memory, unique to a computing device, unique to a user, unique to a user profile, unique to an organization, unique to a backend server, unique to a backend server version, processed prior to display, processed at the time of display, processed at the time of synchronization, processed upon creation, processed upon download, stored in order, stored out-of-order, and/or stored separately. State containers and/or update packets may correspond to a graph, plot, chart, spreadsheet, document, schedule, visualization, image, video, audio recording, haptic feedback, and/or transducer output of a computing device. In some embodiments, state containers and/or update packets may be filtered (e.g. based on one or more characteristics of the state containers and/or update packets), sorted, prioritized (e.g. based on order of importance defined by a user), adjusted, assigned (e.g. to a laborer), and/or placed on hold.

In some embodiments, any system and/or method described herein may be related to an integrated workplace management system (MIMS), a computerized maintenance management system (CMMS), enterprise asset management (EAM), enterprise resource planning (ERP), and/or computer-aided facility management (CAFM). State containers and/or update packets may be associated with real-world assets, inventory, tasks, and/or schedules. State containers, update packets, and/or the display thereof may be used to determine asset availability, maintenance schedules, maintenance costs, inventory, automate property management tasks, visualize real estate, monitor labor resources, track equipment maintenance, track the location of one or more assets and/or inventory, manage real estate, manage energy usage, monitor energy usage, manage capital projects, manage one or more projects, access procedures, view floor plans, prioritize work orders, locate requests, map routes, pre-populate forms, attach images, report safety incidents, request changes, make comments, re-assign approval requests, review punch lists, monitor environment sustainability, manage leasing, determine asset utilization, submit work orders, access work orders, update work orders, perform time entry, review time entries, request facility usage, report incidents, place a reservation, assess asset condition, audit real estate facilities, manage asset inspections, request approval, provide approval, check attachments, monitor project schedule, monitor project budgets, review project documents, upload project documents, perform an inventory cycle count, review an inventory cycle count, monitor inventory reception, monitory inventory distribution, manage inventory distribution, centralize and/or synchronize one or more asset-related databases, reserve one or more assets, and or manage physical space associated with one or more assets. In some embodiments, an inventory valuation method may be based on average cost, first-in first-out (FIFO) price, last-in first-out (LIFO) price, and/or a manual unit price definition.

One or more computing devices (e.g. a backend server) may run one or more computing processes associated with IWMS, CMMS, EAM, ERR and/or CAFM. For example, IBM TRIRIGA and/or IBM Maximo may be serve as a database and/or a set of data processing instructions for storing and/or processing one or more state containers and/or update packets. One or more additional software applications may interface with and/or run on top of a computing process such as IBM TRIRIGA, IBM Maximo, and/or any software-as-a-service (SaaS) software platform (which may be owned and/or operated by a third-party). An application programming interface (API) may be used to communicate with a database and/or set of data processing instructions (and/or the computing device thereof), such as IBM TRIRIGA and/or IBM Maximo. Alternatively or additionally, a backend computing process and/or application platform (e.g. IBM TRIRIGA) may comprise one or more connector functions and or extended functions for interfacing with another software application. One or more intermediate servers may be used between a backend server (e.g. a computing device running IBM TRIRIGA) and a user device and/or mobile device. For example, a backend server may belong to a third-party, and an intermediate server may be operated and/or controlled by the same party providing a software application to a user device and/or mobile device.

In some embodiments, a first computing device (e.g. a user device and/or mobile device) may communicate with a second computing device (e.g. a server and/or backend server running a software application) via an application programming interface (API). For example, the first computing device may request recent data un-transmitted data, new data, verification of synchronization between the first computing device and the second computing device, and/or available data from the second computing device. In some embodiments, a synchronization of the data (e.g. state containers and/or update containers) of the first computing device and the second computing device may be trigger-based. A trigger initiating synchronization could comprise data creation, data reading, data updating, data modifying, data deletion, data removal, data moving, data storage, a time of day, a user request, a location associated with at least one of the first computing device and the second computing device, a storage threshold being reached, a time delay, a time period, a device request, a heartbeat signal, a user action, and/or a gesture performed on a computing device (e.g. a physical movement of a computing device measured by an inertial sensor such as an accelerometer, gyroscope, and/or magnetometer).

In some embodiments, synchronization of the data (e.g. one or more state containers and/or one or more update packets) comprised in a first computing device and a second computing device may be performed upon establishment and/or re-establishment of a computing network connection between the first computing device and the second computing device. Additionally or alternatively, synchronization of the data may be performed while the first computing device and the second computing device are already connected. For example, the second computing device may send a push notification and/or proactively transmit data and/or a signal indicating that data is available (e.g. for synchronization) to the first computing device. In other words, "offline synchronization" and/or "online synchronization" of the data comprised on one or more computing devices may occur. Additionally or alternatively, synchronization may occur in the "background" (e.g. not readily apparent to a user of the computing device performing, and/or undergoing the synchronization process). Additionally or alternatively, synchronization may comprise and/or be associated with a "backup" of the data stored on at least one computing device (e.g. duplicate the data stored on one computing device in case that data becomes destroyed and/or no longer available).

In some embodiments, data (e.g. data associated with one or more state containers and/or update packets may be stored entirely on one or more computing devices, may be distributed among one or more computing devices, and/or may be downloaded locally on an as-needed basis. For example, in some embodiments, a first computing device (e.g. a user device and/or mobile device) may store all data associated with one or more state containers and/or update packets locally on the first computing device. In some embodiments, the first computing device may only access and/or download locally data associated with one or more state containers and/or update packets as-needed by a software application running on the first computing device and/or as-requested by a user associated with the first computing device. In some embodiments, a second computing device (e.g. a server, a backend server, a workstation, a PC) may serve as a long-term storage location and/or as a "ground truth", and may house and/or store data that the first computing device may not possess and/or may delete after use (e.g. for data storage constraint and/or processing power purposes). That is, the second computing device and/or a database thereof may serve as a remote storage and/or processing device. In some embodiments, a computing device may comprise a server, backend server, application server, remote server, and/or backend application server.

In some embodiments, a software application handling, managing, storing, synchronizing, indexing, analyzing, queueing, transmitting, receiving, displaying, and/or processing state containers and/or update packets may be executed locally on a computing device (e.g. a mobile device, a user device, and/or a server), may be executed remotely on the cloud (e.g. on a server, application server, and/or backend server), may be distributed via an application marketplace (e.g. a mobile app store), may comprise a single code base deployable on one or more platforms (e.g. "cross-platform"), may employ a user experience (UX) framework with REST APIs, may use SOAP APIs, may use OSLC APIs, may be written in TypeScript, may be written in JavaScript, may be compiled by a cross-platform compiler and/or framework (e.g. Cordova), may be built on the IONIC and/or Angular framework, may use NGRX, may use REDUX, may, use data-source independent observables for a user interface, may be a native application, may be a mobile application, may interact with a mobile operating system such as iOS and/or Android, may be a desktop application, and/or may support a suite of application features related to AVMS. A mobile device and/or mobile application.

In some embodiments, synchronization may occur in the background and/or be performed by background computing processes of a mobile device and/or remote server. Alternatively or additionally, synchronization between one or more mobile devices and/or remote servers may occur while the one or more mobile devices and/or remote servers are connected over the network and/or are in an "online mode". That is, synchronization need not only occur when a network connection is established and/or reestablished, but may take place at any time regardless of the network connectivity of the one or more mobile devices and/or remote servers (e.g. based on a pre-determined schedule, generation of new data reception of new data request for synchronization, and/or modification of existing data). In some embodiments, synchronization may comprise analyzing the contents of one or more state containers and/or update packets, and determining, if and/or how to update local memory and/or one more state containers. For instance, two or more update packets that perform "inverse" and/or "negative" operations relative to one another (e.g. a first update packet adds a file while a second update packet deletes at least a portion of the file) may be analyzed prior to applying the two or more update packets to a state container, thereby allowing for an associated computing process and/or computing instructions thereof to avoid duplicative and/or redundant operations, such that the associated computing process and/or computing instructions can perform a more efficient updating of a state container based on the two or more update packets (e.g. don't apply the first update packet or the second update packet to a state container if the update packets cancel each other.)

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages. A non-transitory computer readable medium may comprise code configured to perform any of the methods described herein. A non-transitory computer readable medium may, comprise computer memory and/or computer memory may comprise a non-transitory computer readable medium. Any computing device or system described herein may comprise memory and/or a non-transitory computer readable medium. Any component of any system and/or method described herein may be combined with any other (including the same) component of any system and/or method described herein. Any step of any method and/or process may be combined with any other step (or a same step) of any other (or same) method and/or process. Any system operable to realize a described method or process could be used. A described system could be configured to carry out any method, step, and/or procedure which the system is operable to carry out. Data may be transmitted in any configuration among a server, user, application, device, file, interactive file, internet, and/or file generation environment.

Various terms used herein have special meanings within the present technical field. Whether a particular term should be construed as such a "term of art," depends on the context in which that term is used. "Connected to," "in communication with," "communicably linked to," "in communicable range of" other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, any section headings provided herein are for consistency with the suggestions under 37 CFR. 1.77 or otherwise to provide organizational cues. These headings shall not limit or characterize the implementations set out in any claims that may issue from this disclosure. Specifically and by way of example, although the headings may refer to a "Technical Field," such claims should not be limited by the language chosen under this heading to describe the so-called technical field. Further, a description of a technology in the "Background" is not to be construed as an admission that technology is prior art to any implementations in this disclosure, Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein. Any list of items, things, information, etc., is non-limiting, and may include other items, things, information, etc.

Additionally, although similar reference numbers may be used to refer to similar elements for convenience, it can be appreciated that each of the various example implementations may be considered distinct variations.

Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally may be combined with additional features or steps. Such option may not be exercised and, indeed, in some embodiments, disclosed systems, compositions, apparatuses, and/or methods may exclude any, other features or steps beyond those disclosed herein. Elements, devices, methods, and method steps not recited may be included or excluded as desired or required. Persons skilled in the art may make various changes in methods of preparing and using a device and/or system of the disclosure.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable, in some embodiments, to mix and match range endpoints. Also, in some embodiments, each figure disclosed (e.g., in one or more of the examples, tables, and/or drawings) may form the basis of a range (e.g., depicted value+/− about 10%, depicted value+/− about 50%, depicted value+/− about 100%) and/or a range endpoint. With respect to the former, a value of 50 depicted in an example, table, and/or drawing may form the basis of a range of, for example, about 45 to about 55, about 25 to about 100, and/or about 0 to about 100, Disclosed percentages are weight percentages except where indicated otherwise.

It will be understood that particular embodiments described herein are shown by way of illustration and not as limitations of the disclosure. The principal features of this disclosure can be employed in various embodiments without departing from the scope of the disclosure. Those skilled in the art will recognize, or be able to ascertain using, no more than routine experimentation, numerous equivalents to the specific procedures described herein. Such equivalents are considered to be within the scope of this disclosure and are covered by the claims.

The title, abstract, background, and headings are provided in compliance with regulations and/or for the convenience of the reader. They include no admissions as to the scope and content of prior art and no limitations applicable to all disclosed embodiments.

The use of the word "or an" when used in conjunction with the term "comprising" in the claims and/or the specification may mean "one," but it is also consistent with the meaning of "one or more," "at least one," and "one or more than one" The use of the term "or" in the claims is used to mean "and/or" unless explicitly indicated to refer to alternatives only or the alternatives are mutually exclusive, although the disclosure supports a definition that refers to only alternatives and "and/or," Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"). "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

The term "or combinations thereof" as used herein refers to all permutations and combinations of the listed items preceding the term. For example, "A, B. C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BR AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure include preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

The invention claimed is:

1. A mobile computing device comprising:
    at least one memory comprising mobile application instructions;
    a graphics processing unit (GPU); and
    at least one processing device configured for executing the mobile application instructions, wherein the mobile application instructions cause the at least one processing device to perform operations comprising:
    creating, while in an offline mode such that the mobile computing device is disconnected from a remote application server, a local update packet associated with a state container, the state container including at least one of:
        a first timestamp,
        a first queue identifier, and
        a first sequence identifier;
    storing the local update packet in the memory of the mobile computing device;
    establishing, via a wireless network, a network connection with the remote application server, thereby causing the mobile computing device to enter an online mode;
    synchronizing the memory of the mobile computing device with the remote application server, the synchronizing comprising:
        receiving, from the remote application server, a first packet associated with the state container, the first packet including at least one of:
            a second timestamp,
            a second queue identifier, and
            a second sequence identifier;
        determining, based on at least one of the first timestamp, the first queue identifier, and the first sequence identifier, a sequence of modifications to execute on the contents of the state container, the determining comprising at least one of:
            comparing the first timestamp to the second timestamp,
            comparing the first queue identifier to the second queue identifier, and
            comparing the first sequence identifier to the second sequence identifier,
        executing the sequence of modifications by:
            first modifying contents of the state container based on the local update packet, and
            second modifying the first modified contents of the state container based on a remote update packet; and
    initiating display of, using the GPU, a graphical user interface representation of the second modified contents of the state container to a user of the mobile computing device.

2. The mobile computing device of claim 1, wherein the mobile application instructions cause the at least one processing device to perform the operations of:
    accessing from the memory of the mobile computing device, prior to receiving the first packet from the remote application server, a third timestamp associated with a second packet received by the mobile computing device; and
    comparing the third timestamp to the first timestamp or the second timestamp.

3. The mobile computing device of claim 1, wherein the mobile application instructions cause the at least one processing device to perform the operations of:
    receiving, prior to receiving the first packet from the remote application server, a set of packet identifiers and a first set of timestamps corresponding to the set of packet identifiers;
    accessing, prior to receiving the first packet from the remote application server, a third timestamp associated with a chronologically most recent packet received by the mobile computing device;
    selecting, prior to receiving the first packet from the remote application server, a packet identifier from the set of packet identifiers, the selected packet identifier corresponding to a fourth timestamp, such that the fourth timestamp is chronologically nearest to and chronologically later than the third timestamp; and
    transmitting, prior to receiving the first packet from the remote application server, the selected packet identifier to the remote application server.

4. The mobile computing device of claim 1, wherein the mobile application instructions comprised in the memory are generated by a cross-platform application compiler.

5. The mobile computing device of claim 1, wherein the mobile application instructions cause the at least one processing device to perform an operation of generating a pre-populated state container based on the second modified contents of the state container.

6. The mobile computing device of claim 1, wherein the mobile application instructions cause the at least one processing device to perform an operation of displaying, using the GPU comprised in the mobile computing device and using a GPS receiver comprised in the mobile computing device, a geographical display based on the second modified contents of the state container.

7. The mobile computing device of claim 1, wherein the creating of the local update packet associated with the state container comprises acquiring an image using a sensor comprised in the mobile computing device.

8. The mobile computing device of claim 1, wherein the receiving of the first packet associated with the state container comprises requesting the first packet from the remote application server.

9. The mobile computing device of claim 1, wherein the receiving of the first packet associated with the state container comprises receiving a push notification from the remote application server.

10. The mobile computing device of claim 1, wherein the synchronizing of the memory of the mobile computing device with the remote application server further comprises:
    determining, after receiving the first packet associated with the state container, that first data associated with the local update packet is an inverse of second data associated with the remote update packet;

setting the second modified contents of the state container substantially equal to original contents of the state container; and generating a second packet associated with the state container.

11. A method being performed by a mobile computing device, the mobile computing device comprising: at least one memory comprising mobile application instructions and a state container, a graphics processing unit (GPU), and at least one processing device configured for executing the mobile application instructions, the method comprising:

creating, while in an offline mode such that the mobile computing device is disconnected from a remote application server, a local update packet associated with the state container, the state container including at least one of:
a first timestamp,
a first queue identifier, and
a first sequence identifier;

storing the local update packet in the memory of the mobile computing device;

establishing, via a network, a network connection with the remote application server, thereby causing the mobile computing device to enter an online mode;

synchronizing the memory of the mobile computing device with the remote application server, the synchronizing comprising:

receiving, from the remote application server, a first packet associated with the state container, the first packet including at least one of:
a second timestamp,
a second queue identifier, and
a second sequence identifier;

determining, based on at least one of the first timestamp, the first queue identifier, and the first sequence identifier, a sequence of modifications to execute on the contents of the state container, the determining comprising at least one of:
comparing the first timestamp to the second timestamp,
comparing the first queue identifier to the second queue identifier, and
comparing the first sequence identifier to the second sequence identifier executing the sequence of modifications by:
first modifying contents of the state container based on the local update packet, and
second modifying the first modified contents of the state container based on a remote update packet; and initiating display of, using the GPU, a graphical user interface representation of the second modified contents of the state container to a user of the mobile computing device.

12. The method of claim 11, further comprising:
accessing from the memory of the mobile computing device, prior to receiving the first packet from the remote application server, a third timestamp associated with a second packet received by the mobile computing device; and
comparing the third timestamp to the first timestamp or the second timestamp.

13. The method of claim 11, further comprising:
receiving, prior to receiving the first packet from the remote application server, a set of packet identifiers and a first set of timestamps corresponding to the set of packet identifiers;
accessing, prior to receiving the first packet from the remote application server, a third timestamp associated with a chronologically most recent packet received by the mobile computing device;
selecting, prior to receiving the first packet from the remote application server, a packet identifier from the set of packet identifiers, the selected packet identifier corresponding to a fourth timestamp, such that the fourth timestamp is chronologically nearest to and chronologically later than the third timestamp; and
transmitting, prior to receiving the first packet from the remote application server, the selected packet identifier to the remote application server.

14. The method of claim 11, wherein the mobile application instructions comprised in the memory are generated by a cross-platform application compiler.

15. The method of claim 11, further comprising generating a pre-populated state container based on the second modified contents of the state container.

16. The method of claim 11, further comprising displaying, using the GPU comprised in the mobile computing device and using a GPS receiver comprised in the mobile computing device, a geographical display based on the second modified contents of the state container.

17. The method of claim 11, wherein the creating of the local update packet associated with the state container comprises acquiring an image using a sensor comprised in the mobile computing device.

18. The method of claim 11, wherein the receiving of the first packet associated with the state container comprises requesting the first packet from the remote application server.

19. The method of claim 11, wherein the receiving of the first packet associated with the state container comprises receiving a push notification from the remote application server.

20. The method of claim 11, wherein the synchronizing of the memory of the mobile computing device with the remote application server further comprises:
determining, after receiving the first packet associated with the state container, that first data associated with the local update packet is an inverse of second data associated with the remote update packet;
setting the second modified contents of the state container substantially equal to original contents of the state container; and
generating a second packet associated with the state container.

* * * * *